(12) United States Patent
Hussain et al.

(10) Patent No.: US 10,601,838 B2
(45) Date of Patent: Mar. 24, 2020

(54) DIGITAL RIGHTS MANAGEMENT (DRM)—AGNOSTIC ENTITLEMENT GATEWAY AND VERIFICATION SYSTEM AND METHOD

(71) Applicant: CenturyLink Intellectual Property LLC, Denver, CO (US)

(72) Inventors: Asghar Hussain, Parker, CO (US); Zubin Ingah, Centennial, CO (US); Michael D. Sprenger, Boulder, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 191 days.

(21) Appl. No.: 15/822,448

(22) Filed: Nov. 27, 2017

(65) Prior Publication Data

US 2018/0309762 A1 Oct. 25, 2018

Related U.S. Application Data

(60) Provisional application No. 62/489,657, filed on Apr. 25, 2017.

(51) Int. Cl.
*H04L 29/06* (2006.01)
*H04W 12/08* (2009.01)
*H04N 21/4627* (2011.01)
*G06F 21/10* (2013.01)
*H04N 21/835* (2011.01)

(52) U.S. Cl.
CPC ............ *H04L 63/102* (2013.01); *G06F 21/10* (2013.01); *H04L 63/0281* (2013.01); *H04N 21/4627* (2013.01); *H04W 12/08* (2013.01); *G06F 2221/2145* (2013.01); *H04L 2463/101* (2013.01); *H04N 21/835* (2013.01)

(58) Field of Classification Search
None
See application file for complete search history.

(56) References Cited

U.S. PATENT DOCUMENTS

| 2009/0013174 A1* | 1/2009 | Foti | H04L 63/10 713/151 |
|---|---|---|---|
| 2012/0017282 A1* | 1/2012 | Kang | G06F 21/10 726/26 |
| 2013/0268963 A1* | 10/2013 | Nugent | H04N 21/435 725/32 |

* cited by examiner

*Primary Examiner* — Joseph P Hirl
*Assistant Examiner* — Hassan Saadoun

(57) ABSTRACT

Novel tools and techniques are provided for implementing digital rights management ("DRM")-agnostic entitlement gateway and verification system. In various embodiments, an entitlement gateway might receive a query from a client device, and might determine whether a user is authorized to access requested DRM-protected media content. If not, the entitlement gateway might send a deny signal to the client device that prevents the user from accessing the media content. If so, the entitlement gateway might identify, from among a plurality of DRM types, a DRM type that is used to protect the media content. The entitlement gateway might identify, from among a plurality of DRM servers each associated with a particular DRM type, a DRM server associated with the identified DRM type, and might send a request for a license for accessing the media content from the identified DRM server, the license enabling the user to access the media content.

17 Claims, 10 Drawing Sheets

400

DIGITAL RIGHTS MANAGEMENT (DRM)—AGNOSTIC ENTITLEMENT GATEWAY AND VERIFICATION SYSTEM AND METHOD

CROSS-REFERENCES TO RELATED APPLICATIONS

This application claims priority to U.S. Patent Application Ser. No. 62/489,657 (the "'657 application"), filed Apr. 25, 2017 by Asghar Hussain et al., entitled, "DRM-agnostic Entitlement Gateway and Verification System," the disclosure of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing media content streaming or playback, and, more particularly, to methods, systems, and apparatuses for implementing digital rights management ("DRM")-agnostic entitlement gateway and verification system.

BACKGROUND

Established video and audio streaming, on-demand, and pay-per-view systems all include some form of digital rights management ("DRM") system or technology. Current DRM, entitlement, and encryption systems, however, are able to handle only a single type of DRM mechanism, and typically require distinct implementations for handling multiple types of DRM mechanisms, generally residing on separate systems. Such systems need to be tied together at a higher level and require a considerable effort of integration across different DRM types in order to handle multiple types of DRM protection. Many entitlement systems have to share entitlement data and store them in their own storage devices. This duplicates the data, requiring additional storage space. Such conventional techniques may also cause consistency problems across multiple databases. Further, real-time access is much more difficult to implement in such a scenario.

Hence, there is a need for more robust and scalable solutions for implementing media content streaming or playback, and, more particularly, to methods, systems, and apparatuses for implementing DRM-agnostic entitlement gateway and verification system.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
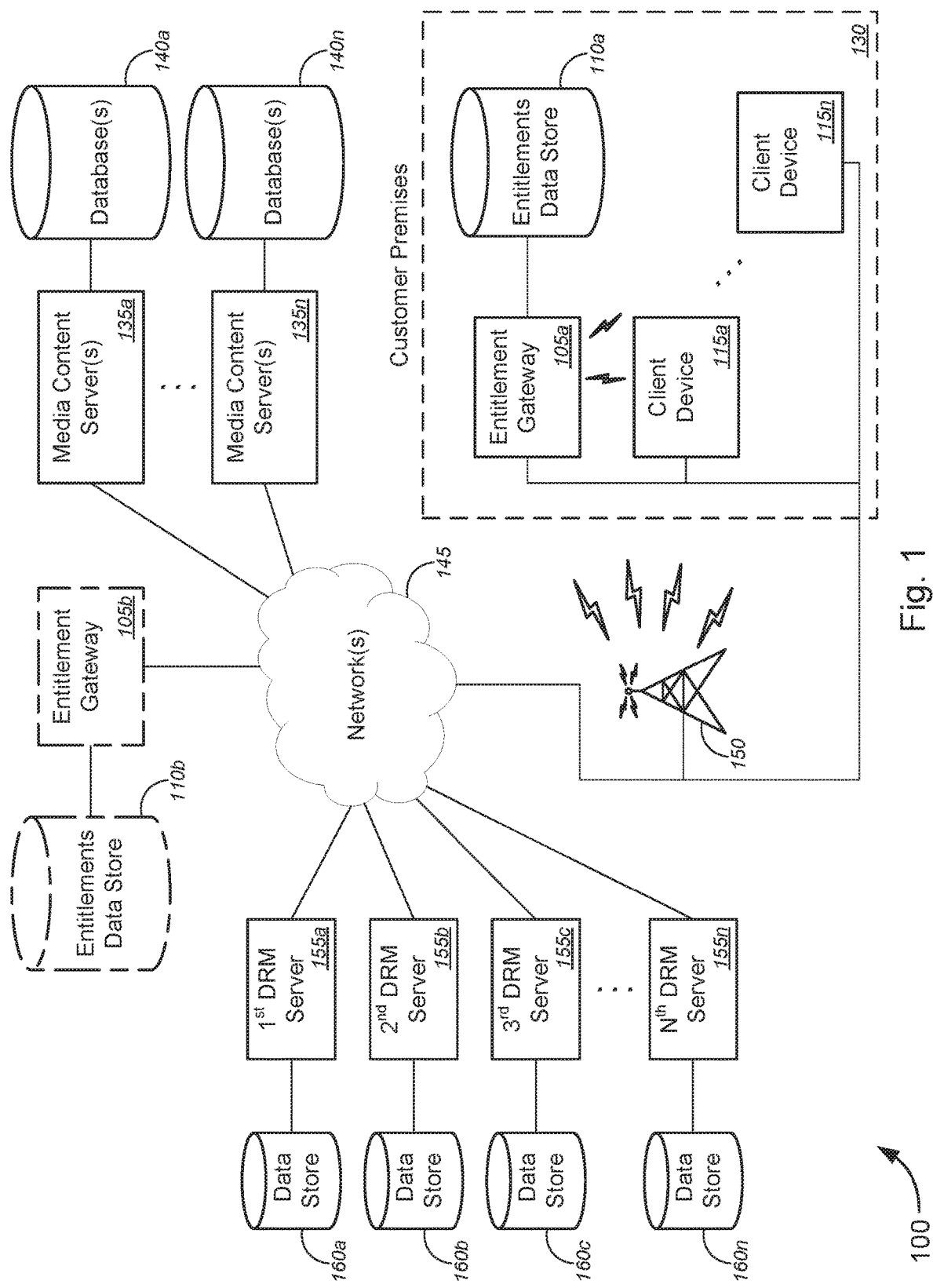
FIG. 1 is a schematic diagram illustrating a system for implementing digital rights management ("DRM")-agnostic entitlement gateway and verification system, in accordance with various embodiments.

Various embodiments provide tools and techniques for implementing media content streaming or playback, and, more particularly, to methods, systems, and apparatuses for implementing digital rights management ("DRM")-agnostic entitlement gateway and verification system.

In various embodiments, a client device might receive a request from a user to access media content that is protected by DRM technology. The client device might send a query to the one or more media content servers (and/or the corresponding one or more databases) to request entitlement information (e.g., entitlement requirements, or the like) associated with the requested DRM-protected media content, in response to receiving the request from the user (and/or the associated client device). In response to receiving the requested entitlement information associated with the requested DRM-protected media content, the client device might send a query to entitlement gateway to determine whether the user (and/or the associated client device) is authorized to access the requested DRM-protected media content. Based on a determination that the user (and/or the associated client device) is not authorized to access the requested DRM-protected media content, the entitlement gateway might send a deny signal to the client device that prevents the user (and/or the associated client device) from accessing the requested DRM-protected media content. Based on a determination that the user (and/or the associated client device) is authorized to access the requested DRM-protected media content, the entitlement gateway might identify, from among a plurality of DRM types, a DRM type that is used to protect the requested DRM-protected media content. Based on the identified DRM type, the entitlement gateway might identify, from among a plurality of DRM servers each associated with a particular DRM type, a DRM server associated with the identified DRM type that is used to protect the requested DRM-protected media content, and might send a request for a license for accessing the requested DRM-protected media content from the identified DRM server associated with the identified DRM type that is used to protect the requested DRM-protected media content. In response to receiving the license for accessing the requested DRM-protected media content from the DRM server associated with the identified DRM type, the entitlement gateway might send the license to the client device, the license enabling the user (and/or the associated client device) to access the requested DRM-protected media content.

In some embodiments, the entitlement gateway might be embodied within a device comprising at least one of a dedicated entitlement gateway device, a set-top box ("STB"), a digital video recording ("DVR") device, a main display device running a software application ("app"), a user device running an app, a server computer over a network, a cloud-based computing system over a network, a media player, or a gaming console, and/or the like. In some cases, the client device might comprise one of a laptop computer, a tablet computer, a smart phone, a mobile phone, a personal digital assistant, a remote control device, or a portable gaming device, and/or the like.

According to some embodiments, the requested DRM-protected media content might comprise at least one of video content, video-on-demand ("VoD") content, streaming video content, pay-per-view ("PPV") video content, audio content, audio-on-demand ("AoD") content, streaming audio content, pay-per-listen ("PPL") audio content, image content, game content, game-on-demand content, streaming game content, or pay-per-play ("PPP") game content, and/or the like. In some instances, the plurality of DRM types might be based on DRM technology systems each comprising one of PlayReady, FairPlay, Widevine, FreeWheel, Adobe Access, or Advanced Access Control System ("AACS"), and/or the like.

Merely by way of example, in some cases, determining whether the user is authorized to access the requested DRM-protected media content might comprise determining, with the entitlement gateway, whether the user is authorized to access the requested DRM-protected media content by authenticating client device-identifying information. In some cases, the client device-identifying information might be stored in an entitlements data store.

The various embodiments are thus directed to an entitlement system that is agnostic to the type of DRM mechanism used, and is sufficiently broad to handle all currently available DRM technologies and automatically apply the correct exchange of DRM requests. Being DRM-agnostic, the various embodiments also allow for new (i.e., future) DRM systems to be added with incremental effort, rather than requiring an entire system re-design.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, media content streaming or downloading technology, implementing digital rights management ("DRM") technology, and/or the like. In other aspects, certain embodiments, can improve the functioning of user equipment or systems themselves (e.g., media content streaming or downloading systems, DRM systems, etc.), for example, by, based on a determination that a user is authorized to access requested DRM-protected media content, identifying, with an entitlement gateway and from among a plurality of DRM types, a DRM type that is used to protect the requested DRM-protected media content, the entitlement gateway being agnostic to DRM types; based on the identified DRM type, determining, with the entitlement gateway and from among a plurality of DRM servers each associated with a particular DRM type, a DRM server associated with the identified DRM type that is used to protect the requested DRM-protected media content, and sending, with the entitlement gateway, a request for a license for accessing the requested DRM-protected media content from the identified DRM server; and in response to receiving the license for accessing the requested DRM-protected media content from the identified DRM server associated with the identified DRM type, sending, with the entitlement gateway, the license to the client device, the license enabling the user to access the requested DRM-protected media content; and/or the like. In particular, to the extent any abstract concepts are present in the various embodiments, those concepts can be implemented as described herein by devices, software, systems, and methods that involve specific novel functionality (e.g., steps or operations), such as, dynamically determining the kind of DRM used to protect access to a given media content from among a plurality of different DRM types, automatically applying the correct exchange of DRM requests and credentials associated with the determined DRM type to obtain a license to access the requested DRM-protected media content, and/or the like, to name a few examples, that extend beyond mere conventional computer processing operations. These functionalities can produce tangible results outside of the implementing computer system, including, merely by way of example, optimizing entitlement system implementation to automatically apply correct exchange of DRM requests and credentials associated with the determined DRM type from among a plurality of different DRM types, the determined DRM type protecting media content (including video, audio, image, and/or game content) thus providing for implementation of enhanced multi-DRM entitlement system for media content requested by a user, and/or the like, at least some of which may be observed or measured by customers and/or service providers.

In an aspect, a method might comprise receiving, with an entitlement gateway, a query from a client device for a user to access media content that is protected by digital rights management ("DRM") technology; determining, with the entitlement gateway, whether the user is authorized to access the DRM-protected media content that is requested by the user; and based on a determination that the user is not authorized to access the requested DRM-protected media content, sending, with the entitlement gateway, a deny signal to the client device that prevents the user from accessing the requested DRM-protected media content. The method might also comprise, based on a determination that the user is authorized to access the requested DRM-protected media content, identifying, with the entitlement gateway and from among a plurality of DRM types, a DRM type that is used to protect the requested DRM-protected media content, the entitlement gateway being agnostic to DRM types; and based on the identified DRM type, determining, with the entitlement gateway and from among a plurality of DRM servers each associated with a particular DRM type, a DRM server associated with the identified DRM type that is used to protect the requested DRM-protected media content, and sending, with the entitlement gateway, a request for a license for accessing the requested DRM-protected media content from the identified DRM server. The method might further comprise, in response to receiving the license for accessing the requested DRM-protected media content from the identified DRM server associated with the identified DRM type, sending, with the entitlement gateway, the license to the client device, the license enabling the user to access the requested DRM-protected media content.

In some embodiments, the entitlement gateway might be embodied within a device comprising at least one of a dedicated entitlement gateway device, a set-top box ("STB"), a digital video recording ("DVR") device, a main display device running a software application ("app"), a user device running an app, a server computer over a network, a cloud-based computing system over a network, a media player, or a gaming console, and/or the like. In some cases, the client device might comprise one of a laptop computer, a tablet computer, a smart phone, a mobile phone, a personal digital assistant, a remote control device, or a portable gaming device, and/or the like.

According to some embodiments, the requested DRM-protected media content might comprise at least one of video content, video-on-demand ("VoD") content, streaming video content, pay-per-view ("PPV") video content, audio content, audio-on-demand ("AoD") content, streaming audio content, pay-per-listen ("PPL") audio content, image content, game content, game-on-demand content, streaming game content, or pay-per-play ("PPP") game content, and/or the like. In some instances, the plurality of DRM types might be based on DRM technology systems each comprising one of PlayReady, FairPlay, Widevine, FreeWheel, Adobe Access, or Advanced Access Control System ("AACS"), and/or the like.

Merely by way of example, in some cases, determining whether the user is authorized to access the requested DRM-protected media content might comprise determining, with the entitlement gateway, whether the user is authorized to access the requested DRM-protected media content by authenticating client device-identifying information. In some cases, the client device-identifying information might be stored in an entitlements data store.

In some embodiments, identifying, from among a plurality of DRM types, a DRM type that is used to protect the requested DRM-protected media content might comprise one of: sending, with the entitlement gateway, one or more queries in parallel to all relevant DRM servers among the plurality of DRM servers; sending, with the entitlement gateway, one or more queries sequentially to all relevant DRM servers among the plurality of DRM servers; or sending, with the entitlement gateway, one or more queries to one or more caches to determine the most frequently used DRM scheme, and querying, with the entitlement gateway, the relevant DRM servers among the plurality of DRM servers in order of frequency of use.

In another aspect, an entitlement gateway might comprise at least one processor and a non-transitory computer readable medium communicatively coupled to the at least one processor. The non-transitory computer readable medium might have stored thereon computer software comprising a set of instructions that, when executed by the at least one processor, causes the entitlement gateway to: receive a query from a client device for a user to access media content that is protected by digital rights management ("DRM") technology; determine whether the user is authorized to access the DRM-protected media content that is requested by the user; based on a determination that the user is not authorized to access the requested DRM-protected media content, send a deny signal to the client device that prevents the user from accessing the requested DRM-protected media content; based on a determination that the user is authorized to access the requested DRM-protected media content, identify, from among a plurality of DRM types, a DRM type that is used to protect the requested DRM-protected media content, the entitlement gateway being agnostic to DRM types; based on the identified DRM type, identify, from among a plurality of DRM servers each associated with a particular DRM type, a DRM server associated with the identified DRM type that is used to protect the requested DRM-protected media content, and send a request for a license for accessing the requested DRM-protected media content from the identified DRM server; and in response to receiving the license for accessing the requested DRM-protected media content from the identified DRM server associated with the identified DRM type, send the license to the client device, the license enabling the user to access the requested DRM-protected media content.

According to some embodiments, the entitlement gateway might be embodied within a device comprising at least one of a dedicated entitlement gateway device, a set-top box ("STB"), a digital video recording ("DVR") device, a main display device running a software application ("app"), a user device running an app, a server computer over a network, a cloud-based computing system over a network, a media player, or a gaming console, and/or the like. In some cases, the client device might comprise one of a laptop computer, a tablet computer, a smart phone, a mobile phone, a personal digital assistant, a remote control device, or a portable gaming device, and/or the like.

In some embodiments, the requested DRM-protected media content might comprise at least one of video content, video-on-demand ("VoD") content, streaming video content, pay-per-view ("PPV") video content, audio content, audio-on-demand ("AoD") content, streaming audio content, pay-per-listen ("PPL") audio content, image content, game content, game-on-demand content, streaming game content, or pay-per-play ("PPP") game content, and/or the like. In some instances, the plurality of DRM types might be based on DRM technology systems each comprising one of PlayReady, FairPlay, Widevine, FreeWheel, Adobe Access, or Advanced Access Control System ("AACS"), and/or the like.

Merely by way of example, in some instances, determining whether the user is authorized to access the requested DRM-protected media content might comprise determining whether the user is authorized to access the requested DRM-protected media content by authenticating client device-identifying information. In some cases, the client device-identifying information might be stored in an entitlements data store.

In some embodiments, identifying, from among a plurality of DRM types, a DRM type that is used to protect the requested DRM-protected media content might comprise one of: sending one or more queries in parallel to all relevant DRM servers among the plurality of DRM servers; sending one or more queries sequentially to all relevant DRM servers among the plurality of DRM servers; or sending one or more queries to one or more caches to determine the most frequently used DRM scheme, and querying the relevant DRM servers among the plurality of DRM servers in order of frequency of use.

In yet another aspect, a client device and an entitlement gateway. The client device might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the client device to: receive a request from a user to access media content that is protected by digital rights management ("DRM") technology; in response to receiving the request from the user, send a query to one or more media content servers to request entitlement information associated with the requested DRM-protected media content; and in response to receiving the requested entitlement information associated with the requested DRM-protected media content, sending, with the client device, a query to an entitlement gateway to determine whether the user is authorized to access the requested DRM-protected media content.

The entitlement gateway might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the entitlement gateway to: receive the query from the client device; determine whether the user is authorized to access the DRM-protected media content that is requested by the user; based on a determination that the user is not authorized to access the requested DRM-protected media content, send a deny signal to the client device that prevents the user from accessing the requested DRM-protected media content; based on a determination that the user is authorized to access the requested DRM-protected media content, identify, from among a plurality of DRM types, a DRM type that is used to protect the requested DRM-protected media content, the entitlement gateway being agnostic to DRM types; based on the identified DRM type, identify, from among a plurality of DRM servers each associated with a particular DRM type, a DRM server associated with the identified DRM type that is used to protect the requested DRM-protected media content, and send a request for a license for accessing the requested DRM-protected media content from the identified DRM server; and in response to receiving the license for accessing the requested DRM-protected media content from the identified DRM server associated with the identified DRM type, send the license to the client device, the license enabling the user to access the requested DRM-protected media content.

In some embodiments, the entitlement gateway might be embodied within a device comprising at least one of a dedicated entitlement gateway device, a set-top box ("STB"), a digital video recording ("DVR") device, a main display device running a software application ("app"), a user device running an app, a server computer over a network, a cloud-based computing system over a network, a media player, or a gaming console, and/or the like. In some cases, the client device might comprise one of a laptop computer, a tablet computer, a smart phone, a mobile phone, a personal digital assistant, a remote control device, or a portable gaming device, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing media content streaming or playback, and, more particularly, to methods, systems, and apparatuses for implementing digital rights management ("DRM")-agnostic entitlement gateway and verification system, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing digital rights management ("DRM")-agnostic entitlement gateway and verification system, in accordance with various embodiments.

In the non-limiting embodiment of FIG. 1, system 100 might comprise an entitlement gateway 105a and corresponding entitlements data store 110a, one or more client devices 115a-115n (collectively, "client devices 115" or the like), each of which might be located at customer premises 130, which might be one of a single family house, a multi-dwelling unit ("MDU") within a multi-dwelling complex (including, but not limited to, an apartment building, an apartment complex, a condominium complex, a townhouse complex, a mixed-use building, etc.), a motel, an inn, a hotel, an office building or complex, a commercial building or complex, an industrial building or complex, and/or the like. According to some embodiments, the entitlement gateway 105a might be embodied within a device including, without limitation, at least one of a dedicated entitlement gateway device, a set-top box ("STB"), a digital video recording ("DVR") device, a main display device running a software application ("app"), a user device running an app, a server computer over a network, a cloud-based computing system over a network, a media player, or a gaming console, and/or the like. In some cases, each client device 115 might include, but is not limited to, one of a laptop computer, a tablet computer, a smart phone, a mobile phone, a personal digital assistant, a remote control device, or a portable gaming device, and/or the like.

In some embodiments, system 100 might further comprise one or more media content servers 135*a*-135*n* (collectively, "media content servers 135" or the like) and corresponding databases 140*a*-140*n* (collectively, "databases 140" or the like). The entitlement gateway 105*a* and/or the one or more client devices 115 might access the media content servers 135 via one or more networks 145 (and in some cases, also via one or more telecommunications relay systems 150, which might include, without limitation, one or more wireless network interfaces (e.g., wireless modems, wireless access points, and the like), one or more towers, one or more satellites, and/or the like). The lightning bolt symbols are used to denote wireless communications between the one or more telecommunications relay systems 150 and the entitlement gateway 105*a*, between the one or more telecommunications relay systems 150 and each of the client devices 115, and/or the like. According to some embodiments, alternative or additional to the customer premises-based entitlement gateway 105*a* and corresponding entitlements data store 110*a*, system 100 might further comprise remote entitlement gateway 105*b* (collectively with entitlement gateway 105*a*, "entitlement gateway 105" or the like) and corresponding entitlements data store 110*b* (collectively with data store 110*a*, "entitlements data store 110" or the like), which might communicate with one or more of the client devices 115 via the one or more networks 145 (and in some cases, via one or more telecommunications relay systems 150). In some cases, the remote entitlement gateway 105*b* and corresponding entitlements data store 110*b* might communicate with one or more of the media content servers 135 via network(s) 145.

System 100 might further comprise a first DRM server 155*a*, a second DRM server 155*b*, a third DRM server 155*c*, through an N$^{th}$ DRM server 155*n* (collectively, "DRM servers 155" or the like) and corresponding data stores 160*a*, 160*b*, 160*c*, through 160*n* (collectively, "data stores 160" or the like). The requested DRM-protected media content, according to some embodiments, might include, without limitation, at least one of video content, video-on-demand ("VoD") content, streaming video content, pay-per-view ("PPV") video content, audio content, audio-on-demand ("AoD") content, streaming audio content, pay-per-listen ("PPL") audio content, image content, game content, game-on-demand content, streaming game content, or pay-per-play ("PPP") game content, and/or the like. In some instances, the plurality of DRM types are based on DRM technology systems might each include, but are not limited to, one of PlayReady, FairPlay, Widevine, FreeWheel, Adobe Access, or Advanced Access Control System ("AACS"), and/or the like.

In operation, a client device 115 might receive a request from a user to access media content that is protected by DRM technology. The client device 115 might send a query to the one or more media content servers 135 (and/or the corresponding one or more databases 140) to request entitlement information (e.g., entitlement requirements, or the like) associated with the requested DRM-protected media content, in response to receiving the request from the user (and/or the associated client device 115). In response to receiving the requested entitlement information associated with the requested DRM-protected media content, the client device 115 might send a query to entitlement gateway 105 to determine whether the user (and/or the associated client device 115) is authorized to access the requested DRM-protected media content. Based on a determination that the user (and/or the associated client device 115) is not authorized to access the requested DRM-protected media content, the entitlement gateway 105 might send a deny signal to the client device 115 that prevents the user (and/or the associated client device 115) from accessing the requested DRM-protected media content. Based on a determination that the user (and/or the associated client device 115) is authorized to access the requested DRM-protected media content, the entitlement gateway 105 might identify, from among a plurality of DRM types, a DRM type that is used to protect the requested DRM-protected media content. Based on the identified DRM type, the entitlement gateway 105 might identify, from among a plurality of DRM servers 155 each associated with a particular DRM type, a DRM server 155 associated with the identified DRM type that is used to protect the requested DRM-protected media content, and might send a request for a license for accessing the requested DRM-protected media content from the identified DRM server 155 associated with the identified DRM type that is used to protect the requested DRM-protected media content. In response to receiving the license for accessing the requested DRM-protected media content from the DRM server 155 associated with the identified DRM type, the entitlement gateway 105 might send the license to the client device 115, the license enabling the user (and/or the associated client device 115) to access the requested DRM-protected media content.

The various embodiments are thus directed to an entitlement system that is agnostic to the type of DRM mechanism used, and is sufficiently broad to handle all currently available DRM technologies and automatically apply the correct exchange of DRM requests. Being DRM-agnostic, the various embodiments also allow for new (i.e., future) DRM systems to be added with incremental effort, rather than requiring an entire system re-design.

These and other functionalities and features of the DRM-agnostic entitlement gateway and verification system and method are described in detail below with respect to FIGS. 2-4.

Figure 2:
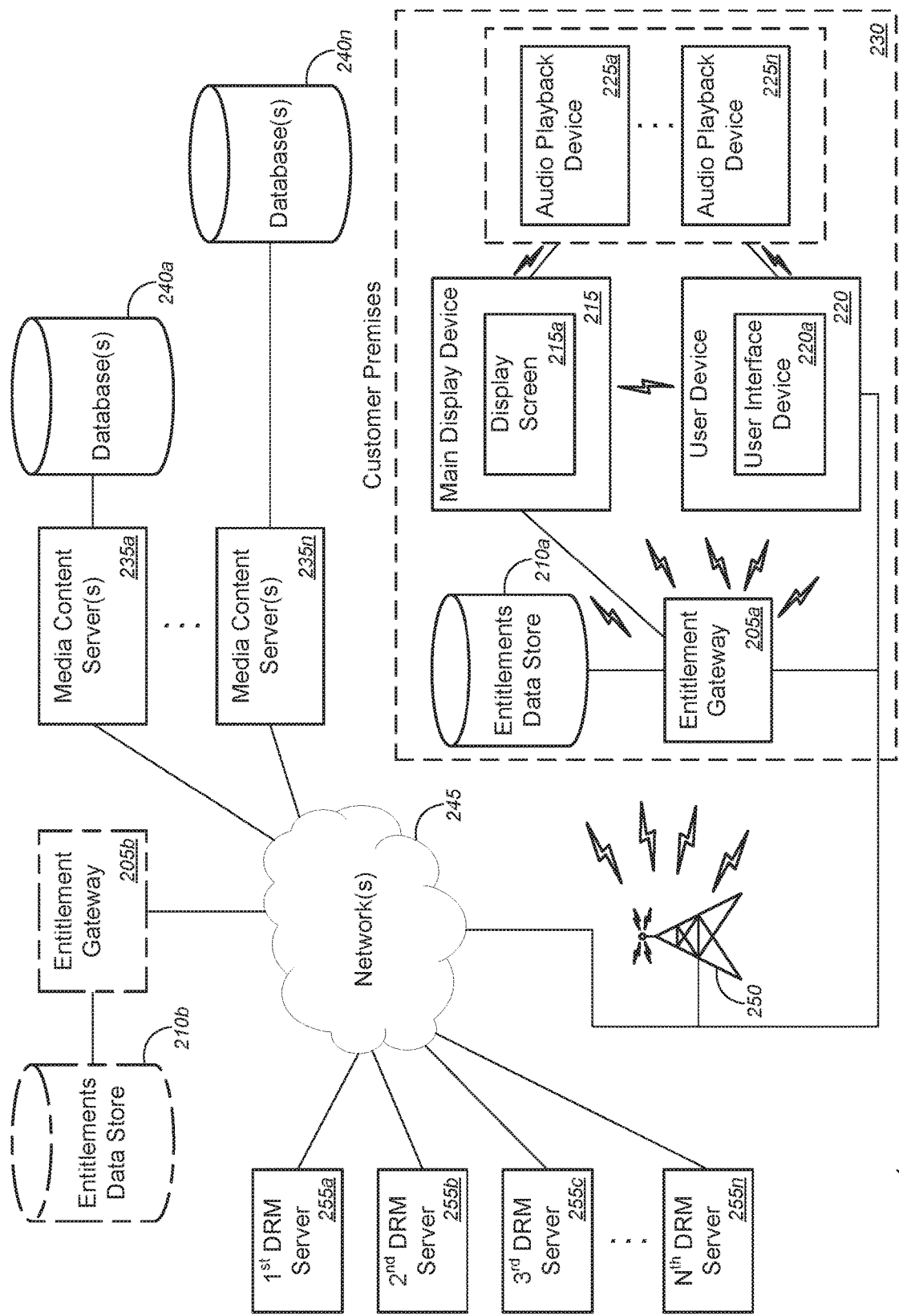
FIG. 2 is a schematic diagram illustrating another system for implementing DRM-agnostic entitlement gateway and verification system, in accordance with various embodiments.

FIG. 2 is a schematic diagram illustrating another system 200 for implementing DRM-agnostic entitlement gateway and verification system, in accordance with various embodiments.

In the non-limiting embodiment of FIG. 2, system 200 might comprise an entitlement gateway 205*a* and corresponding entitlements data store 210*a*. System 200, according to some embodiments, might further comprise one or more main display devices 215 (collectively, "main display devices 215" or the like), which might each include a display screen 215*a*, and one or more user devices 220 (collectively, "user devices 220" or the like), which might each include a touchscreen display or touchscreen display device 220*a*, and/or the like. In some cases, system 200 might further, or optionally, comprise one or more audio playback devices 225*a*-225*n* (collectively, "audio playback devices 225" or "speakers 225" or the like), and/or the like. Each of the one or more main display devices 215 and/or the one or more user devices 220 might communicatively couple to the entitlement gateway 205*a*, and/or to each other, either via wireless connection and/or via wired connection. The one or more user devices 220 might each receive user input from a user (in various embodiments, receiving touch input from the user via the touchscreen display 220a), and might each relay the user input to the entitlement gateway 205a, according to some embodiments. In some cases, the user devices 220 might include, without limitation, at least one of a dedicated remote control device (with touchscreen display) that is associated with the entitlement gateway 205a, a universal remote control device (with touchscreen display) that has been paired, synced, or synchronized with the entitlement gateway 205a, a tablet computer that has been paired, synced, or synchronized with the entitlement gateway 205a, a smart phone that has been paired, synced, or synchronized with the entitlement gateway 205a, or other portable device (with touchscreen display) that has been paired, synced, or synchronized with the entitlement gateway 205a, and/or the like. In alternative embodiments, each user device 220 might include, but is not limited to, one of a laptop computer, a tablet computer, a smart phone, a mobile phone, a personal digital assistant, a remote control device, or a portable gaming device, and/or the like. In some cases, the entitlement gateway 205a, the database 210a, the one or more main display devices 215 (including the display screen(s) 215a and/or the audio playback device(s) 225, etc.), and the user device(s) 220 may be disposed within a customer premises 230, which might be one of a single family house, a multi-dwelling unit ("MDU") within a multi-dwelling complex (including, but not limited to, an apartment building, an apartment complex, a condominium complex, a townhouse complex, a mixed-use building, etc.), a motel, an inn, a hotel, an office building or complex, a commercial building or complex, an industrial building or complex, and/or the like.

According to some embodiments, the entitlement gateway 205a might be embodied within a device including, without limitation, at least one of a dedicated entitlement gateway device, a set-top box ("STB"), a digital video recording ("DVR") device, a main display device running a software application ("app"), a user device running an app, a server computer over a network, a cloud-based computing system over a network, a media player, or a gaming console, and/or the like.

In some embodiments, system 200 might further comprise one or more media content servers 235a-235n (collectively, "media content servers 235" or the like) and corresponding databases 240a-240n (collectively, "databases 240" or the like). The entitlement gateway 205a and/or the one or more user devices 220 might access the media content servers 235 via one or more networks 245 (and in some cases, also via one or more telecommunications relay systems 250, which might include, without limitation, one or more wireless network interfaces (e.g., wireless modems, wireless access points, and the like), one or more towers, one or more satellites, and/or the like). The lightning bolt symbols are used to denote wireless communications between the one or more telecommunications relay systems 250 and the entitlement gateway 205a, between the one or more telecommunications relay systems 250 and each of the user devices 220, and/or the like. According to some embodiments, alternative or additional to the customer premises-based entitlement gateway 205a and corresponding entitlements data store 210a, system 200 might further comprise remote entitlement gateway 205b (collectively with entitlement gateway 205a, "entitlement gateway 205" or the like) and corresponding entitlements data store 210b (collectively with data store 210a, "entitlements data store 210" or the like), which might communicate with one or more of the user devices 220 via the one or more networks 245 (and in some cases, via one or more telecommunications relay systems 250 as well). In some cases, the remote entitlement gateway 205b and corresponding entitlements data store 210b might communicate with one or more of the media content servers 235 via network(s) 245.

System 200 might further comprise a first DRM server 255a, a second DRM server 255b, a third DRM server 255c, through an $N^{th}$ DRM server 255n (collectively, "DRM servers 255" or the like). The requested DRM-protected media content, according to some embodiments, might include, without limitation, at least one of video content, video-on-demand ("VoD") content, streaming video content, pay-per-view ("PPV") video content, audio content, audio-on-demand ("AoD") content, streaming audio content, pay-per-listen ("PPL") audio content, image content, game content, game-on-demand content, streaming game content, or pay-per-play ("PPP") game content, and/or the like. In some instances, the plurality of DRM types are based on DRM technology systems might each include, but are not limited to, one of PlayReady, FairPlay, Widevine, FreeWheel, Adobe Access, or Advanced Access Control System ("AACS"), and/or the like.

In operation, a user device 220 might receive a request from a user to access media content that is protected by DRM technology. The user device 220 might send a query to the one or more media content servers 235 (and/or the corresponding one or more databases 240) to request entitlement information (e.g., entitlement requirements, or the like) associated with the requested DRM-protected media content, in response to receiving the request from the user (and/or the associated user device 220). In response to receiving the requested entitlement information associated with the requested DRM-protected media content, the user device 220 might send a query to entitlement gateway 205 to determine whether the user (and/or the associated user device 220) is authorized to access the requested DRM-protected media content. Based on a determination that the user (and/or the associated user device 220) is not authorized to access the requested DRM-protected media content, the entitlement gateway 205 might send a deny signal to the user device 220 that prevents the user (and/or the associated user device 220) from accessing the requested DRM-protected media content. Based on a determination that the user (and/or the associated user device 220) is authorized to access the requested DRM-protected media content, the entitlement gateway 205 might identify, from among a plurality of DRM types, a DRM type that is used to protect the requested DRM-protected media content. Based on the identified DRM type, the entitlement gateway 205 might identify, from among a plurality of DRM servers 255 each associated with a particular DRM type, a DRM server 255 associated with the identified DRM type that is used to protect the requested DRM-protected media content, and might send a request for a license for accessing the requested DRM-protected media content from the identified DRM server 255 associated with the identified DRM type that is used to protect the requested DRM-protected media content. In response to receiving the license for accessing the requested DRM-protected media content from the DRM server 255 associated with the identified DRM type, the entitlement gateway 205 might send the license to the user device 220, the license enabling the user (and/or the associated user device 220) to access the requested DRM-protected media content.

The entitlement gateway 205a and 205b, the entitlements data stores 210a and 210b, the one or more user devices 220, the one or more media content servers 235a-235n and corresponding databases 240a-240n, the network(s) 245, the one or more telecommunications relay systems 250, and the one or more DRM servers 255a-255n of system 200 in FIG. 2 are otherwise similar, if not identical, to the entitlement gateway 105a and 105b, the entitlements data stores 110a and 110b, the one or more client devices 115, the one or more media content servers 135a-135n and corresponding databases 140a-140n, the network(s) 145, the one or more telecommunications relay systems 150, and the one or more DRM servers 155a-155n of system 100 in FIG. 1, respectively, and the descriptions of these components of system 100 are applicable to the corresponding components of system 200, respectively.

FIGS. 3A-3D (collectively, "FIG. 3") are block diagrams illustrating an embodiment 300 of a DRM-agnostic entitlement gateway and verification system and method.

Figure 3A:
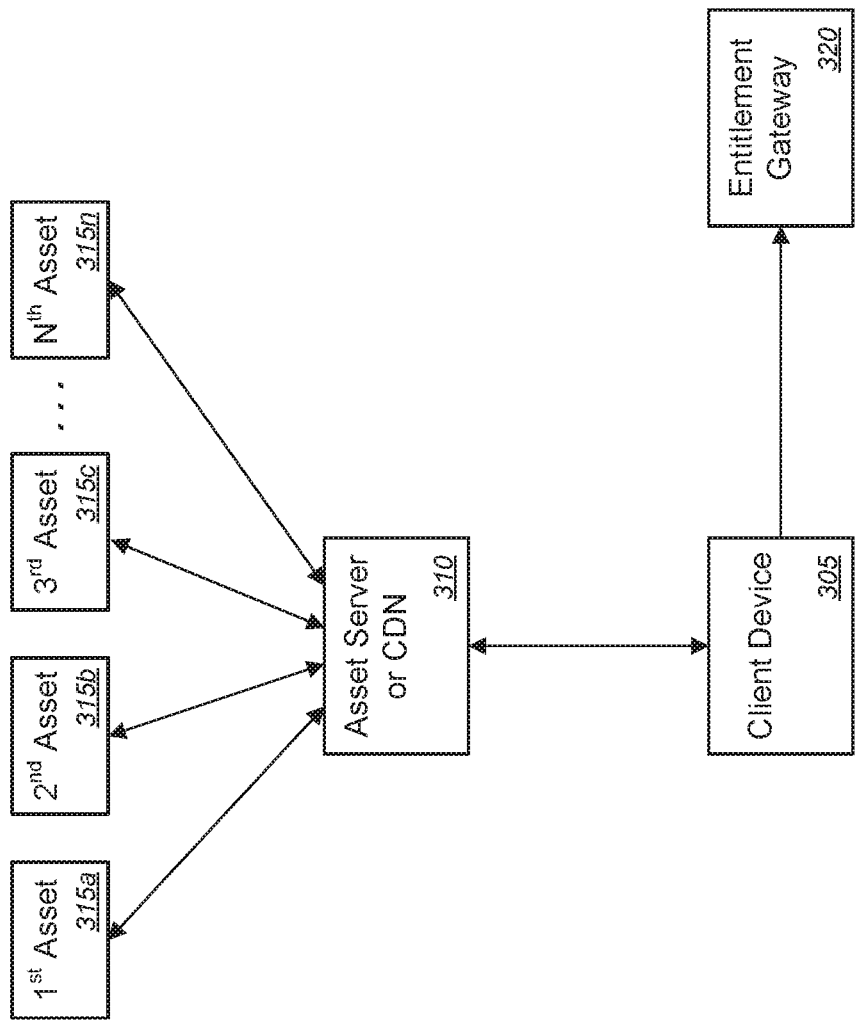
FIGS. 3A-3D are block diagrams illustrating an embodiment of a DRM-agnostic entitlement gateway and verification system and method.

With reference to FIG. 3A, embodiment 300 might comprise a client device 305, asset server (or content delivery network ("CDN")) 310, one or more assets 315a, 315b, 315c, through 315n (i.e., first asset, second asset, third asset, through $N^{th}$ asset; collectively, "assets 315" or the like), and entitlement gateway 310, and/or the like. According to some embodiments, the client device 305 might include, without limitation, one of a laptop computer, a tablet computer, a smart phone, a mobile phone, a personal digital assistant, a remote control device, or a portable gaming device, and/or the like. In some embodiments, the entitlement gateway 320 might be embodied within a device including, without limitation, at least one of a dedicated entitlement gateway device, a set-top box ("STB"), a digital video recording ("DVR") device, a main display device running a software application ("app"), a user device running an app, a server computer over a network, a cloud-based computing system over a network, a media player, or a gaming console, and/or the like.

In operation, in response to receiving a request from a user to access media content that is protected by digital rights management ("DRM") technology, the client device 305 might query the asset server (or CDN) 310 to request entitlement requirements for a specific asset 315—that is, media content or DRM-protected media content. The asset server 310 then responds with entitlement information associated with the asset 315 (i.e., the media content or the DRM-protected media content, or the like), the entitlement information, in some cases, including, but not limited to, entitlement requirements or the like. In response to receiving the requested entitlement information (or entitlement requirements) associated with the asset 315 (i.e., the media content or the DRM-protected media content, or the like), the client device 305 might send a query to an entitlement gateway 320 to determine whether the client device 305 or the user is authorized to access the asset 315 (i.e., the media content or the DRM-protected media content, or the like).

Figure 3B:
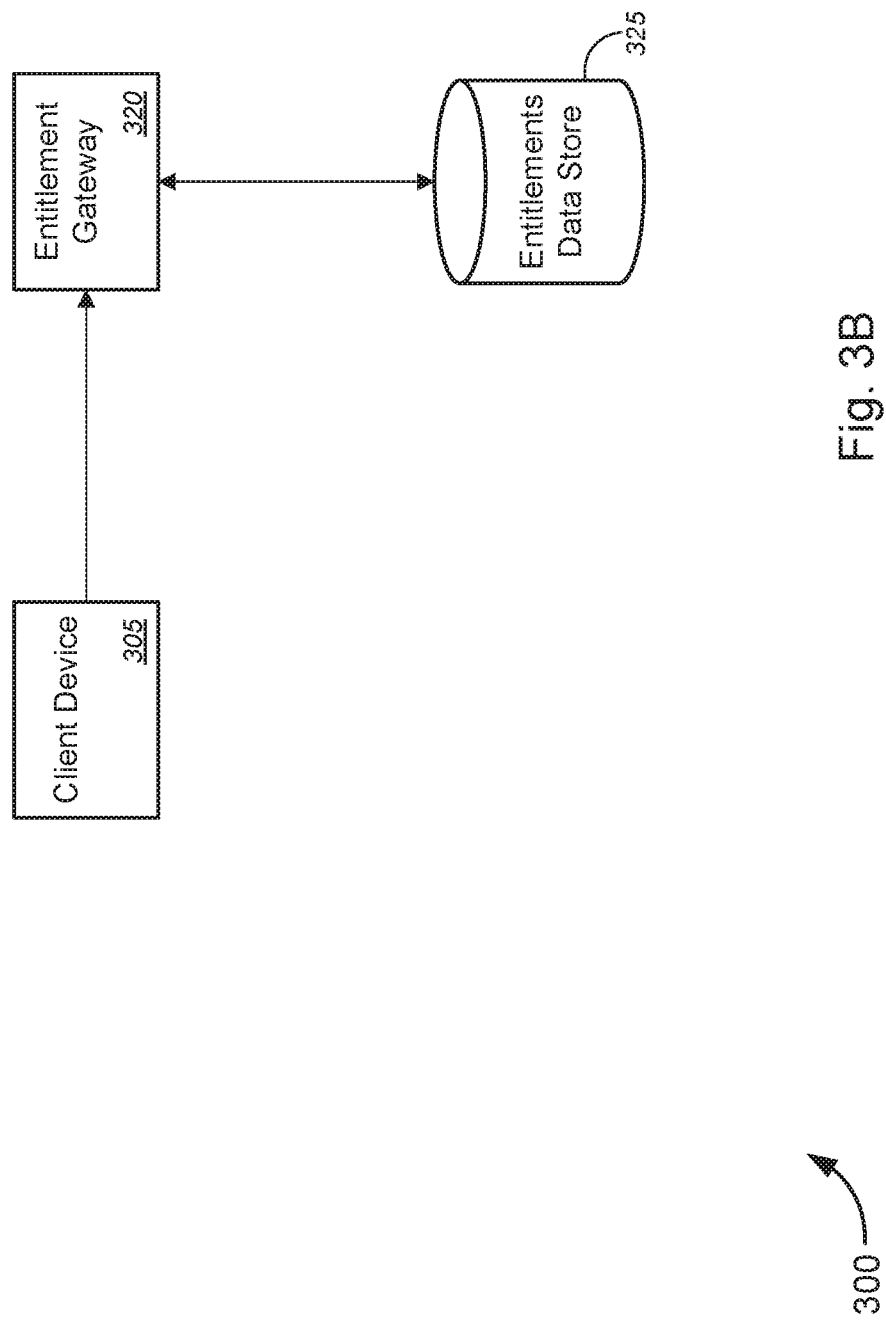

Turning to FIG. 3B, in response to receiving the query from the client device 305, the entitlement gateway 320 might use asset-identifying information and/or client-identifying information, which might be stored in entitlements data store 325, to determine if the client device 305 is authorized to access the asset 315 (i.e., the media content or the DRM-protected media content, or the like).

Figure 3C:
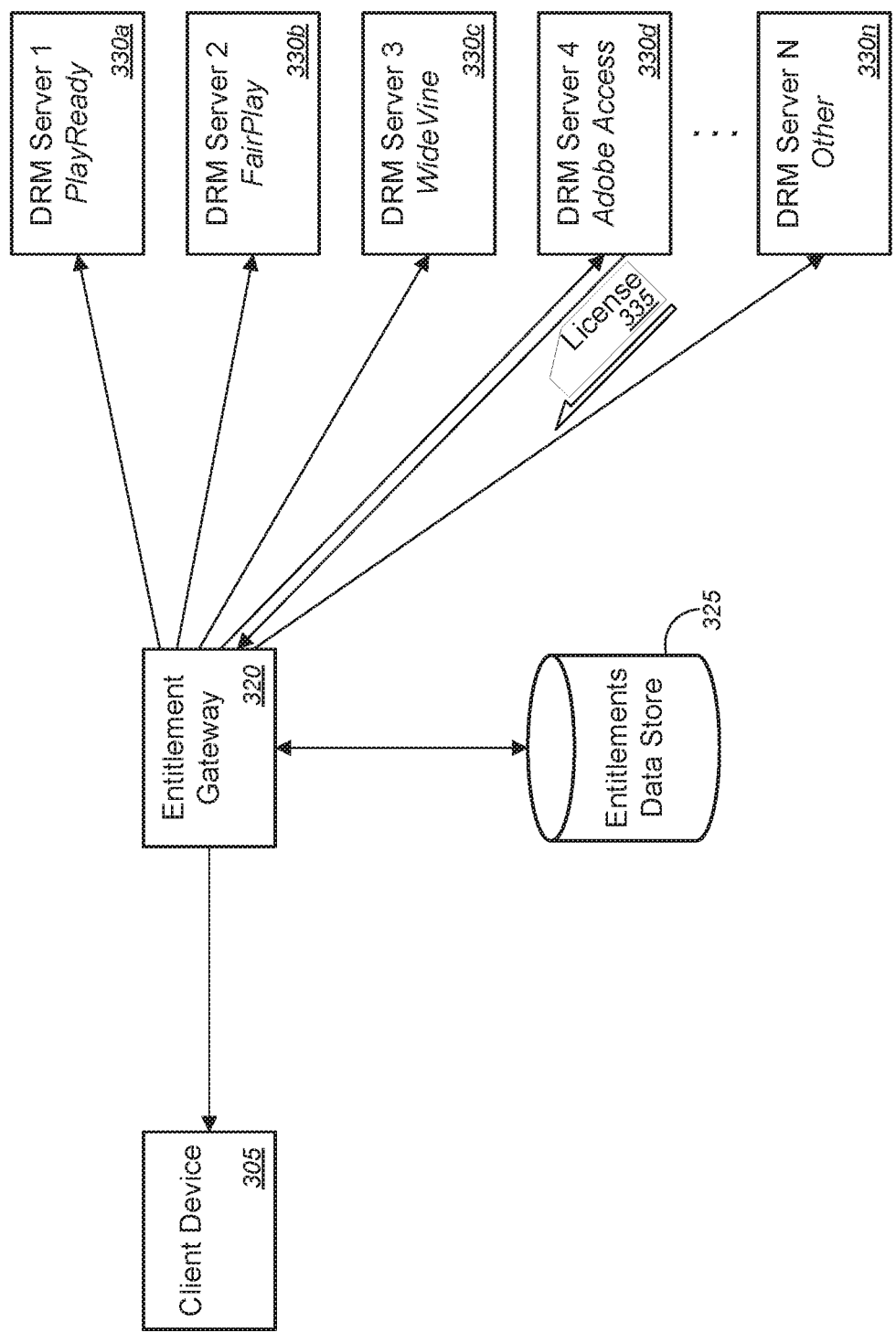

Referring to FIG. 3C, based on a determination that the client device 305 (or the user) is not authorized to access the asset 315 (i.e., the media content or the DRM-protected media content, or the like) (i.e., if entitled=false), the entitlement gateway 320 might send a deny signal to the client device 305 that prevents the client device 305 or the user from accessing the asset 315 (i.e., the media content or the DRM-protected media content, or the like). Based on a determination that the client device 305 (or the user) is authorized to access the asset 315 (i.e., if entitled=false), the entitlement gateway 320 might identify, from among a plurality of DRM types, a DRM type that is used to protect the asset 315. Based on the identified DRM type, the entitlement gateway 320 might identify, from among a plurality of DRM servers 330 each associated with a particular DRM type, a DRM server associated with the identified DRM type that is used to protect the asset 315, and might send a request for a license 335 for accessing the asset 315 from the identified DRM server associated with the identified DRM type that is used to protect the asset 315. The plurality of DRM servers 330 might comprise DRM Server 1 330a, DRM Server 2 330b, DRM Server 3 330c, DRM Server 4 330d, through DRM Server N 330n (collectively, "DRM Servers 330" or the like), or the like. In some embodiments, the plurality of DRM servers 330 corresponding to the plurality of DRM types might be based on DRM technology systems each including, but not limited to, one of PlayReady, FairPlay, Widevine, FreeWheel, Adobe Access, or Advanced Access Control System ("AACS"), and/or the like.

In some embodiments, identifying, from among a plurality of DRM types, a DRM type that is used to protect the asset 315 (i.e., the media content or the DRM-protected media content, or the like) comprises one of sending, with the entitlement gateway 320, one or more queries in parallel to all relevant or appropriate DRM servers 330 among the plurality of DRM servers 330; sending, with the entitlement gateway 320, one or more queries sequentially to all relevant or appropriate DRM servers 330 among the plurality of DRM servers 330; or sending, with the entitlement gateway 320, one or more queries to one or more caches to determine the most frequently used DRM scheme, and querying, with the entitlement gateway 320, the relevant or appropriate DRM servers 330 among the plurality of DRM servers 330 in order of frequency of use. According to some embodiments, the relevant or appropriate DRM servers 330 might be identified in response to the queries to the DRM servers 330.

Figure 3D:
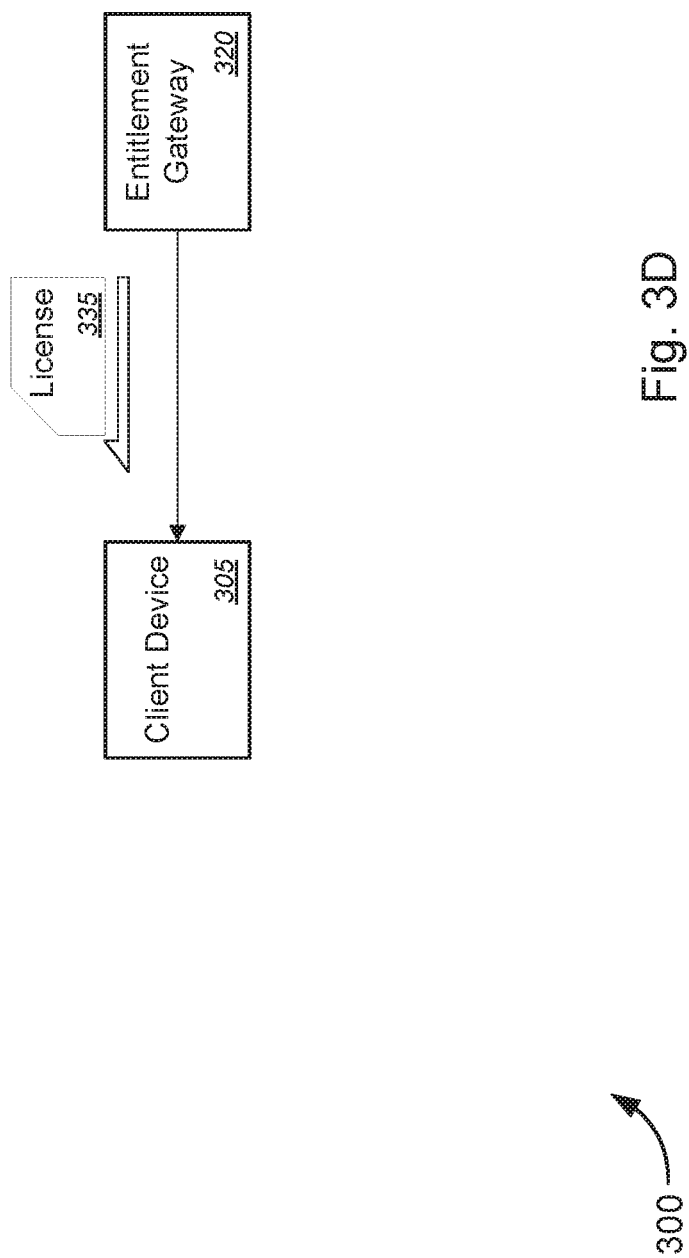

With reference to FIG. 3D, in response to receiving the license 335 for accessing the asset 315 from the identified DRM server associated with the identified DRM type, the entitlement gateway 320 might send the license 335 to the client device, the license 335 enabling the client device 305 or the user to access the asset 315 (i.e., the media content or the DRM-protected media content, or the like).

The entitlement gateway 320, the entitlements data store 325, the client device 305, the asset server or CDN 310, and the one or more DRM servers 330a-330n of system 300 in FIG. 3 are otherwise similar, if not identical, to the entitlement gateway 105a or 105b, the entitlements data stores 110a or 110b, the one or more client devices 115, the one or more media content servers 135a-135n, and the one or more DRM servers 155a-155n of system 100 in FIG. 1, respectively, and the descriptions of these components of system 100 are applicable to the corresponding components of system 300, respectively.

Figure 4A:
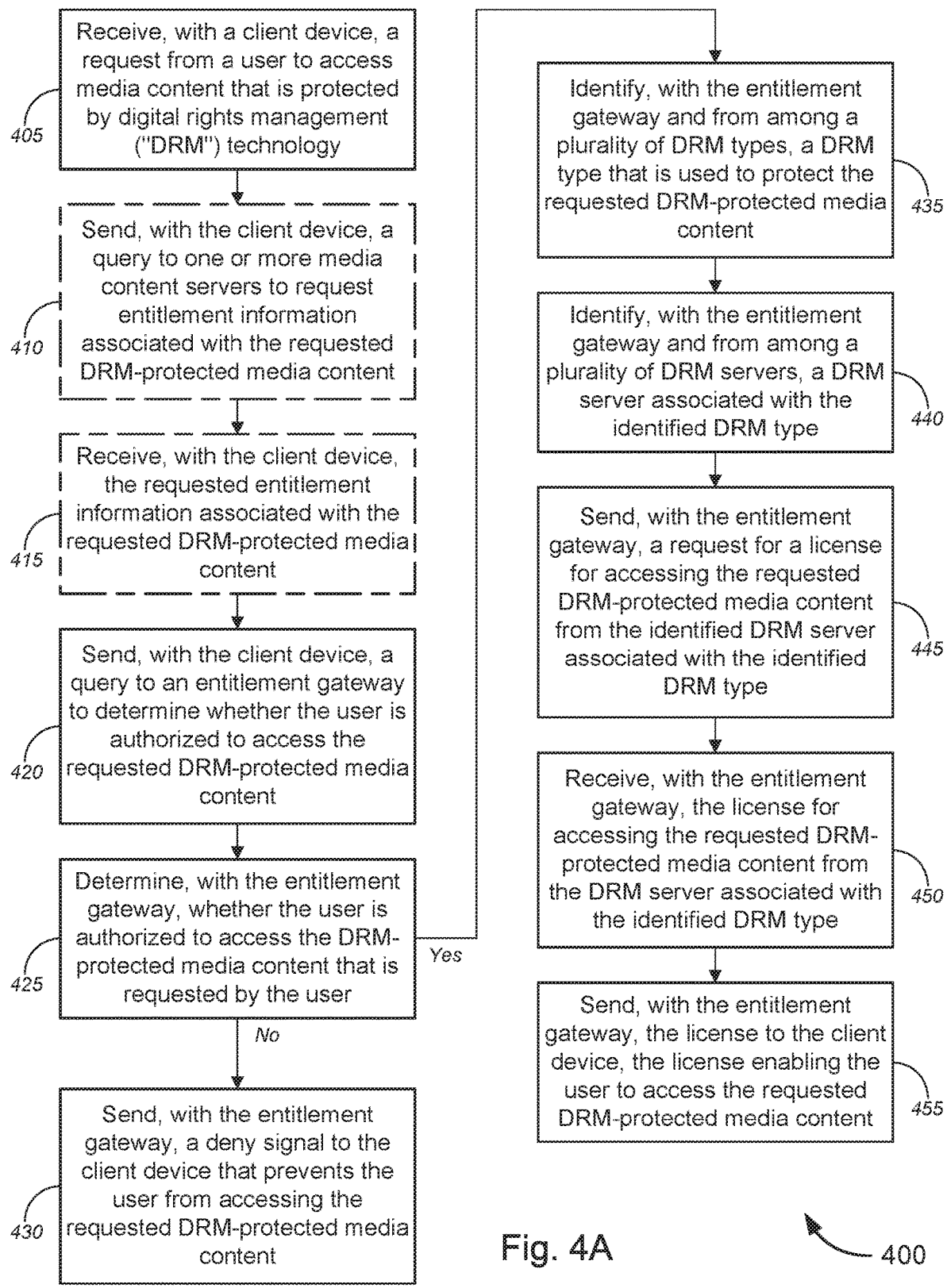
FIGS. 4A and 4B are flow diagrams illustrating a method for implementing DRM-agnostic entitlement gateway and verification system, in accordance with various embodiments.
Figure 4B:
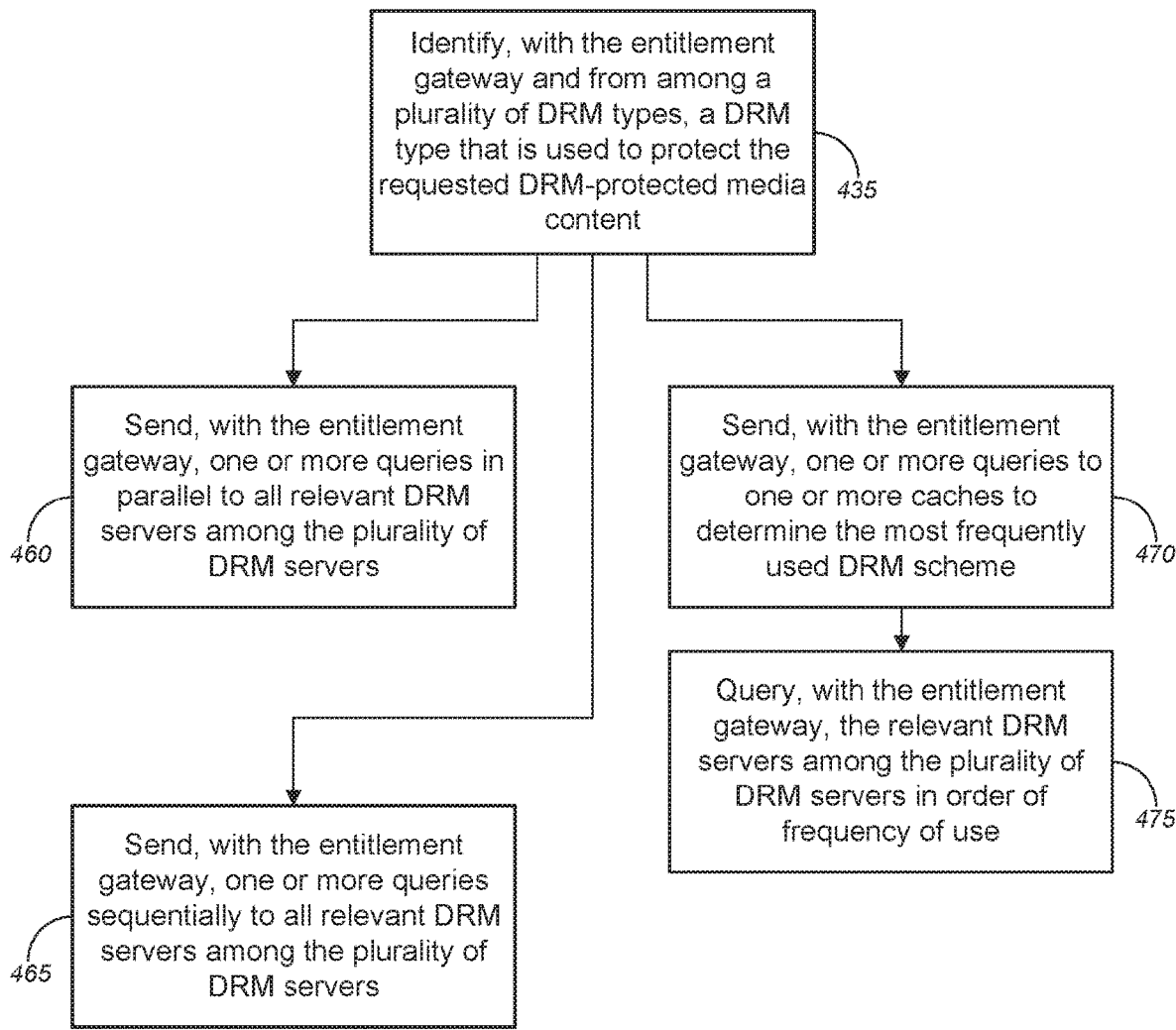

FIGS. 4A and 4B (collectively, "FIG. 4") are flow diagrams illustrating a method 400 for implementing DRM-agnostic entitlement gateway and verification system, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems 100, 200, and 300 of FIGS. 1, 2, and 3, respectively (or components thereof), such methods may also be implemented using any suitable hardware (or software) implementation. Similarly, while each of the systems 100, 200, and 300 of FIGS. 1, 2, and 3, respectively (or components thereof), can operate according to the method 400 illustrated by FIG. 4 (e.g., by executing instructions embodied on a computer readable medium), the systems 100, 200, and 300 of FIGS. 1, 2, and 3 can each also operate according to other modes of operation and/or perform other suitable procedures.

In the non-limiting embodiment of FIG. 4A, method 400, at block 405, receiving, with a client device, a request from a user to access media content that is protected by digital rights management ("DRM") technology. According to some embodiments, the client device might include, but is not limited to, one of a laptop computer, a tablet computer, a smart phone, a mobile phone, a personal digital assistant, a remote control device, or a portable gaming device, and/or the like. In some cases, the requested DRM-protected media content might include, without limitation, at least one of video content, video-on-demand ("VoD") content, streaming video content, pay-per-view ("PPV") video content, audio content, audio-on-demand ("AoD") content, streaming audio content, pay-per-listen ("PPL") audio content, image content, game content, game-on-demand content, streaming game content, or pay-per-play ("PPP") game content, and/or the like.

In response to receiving the request from the user, method 400 might further comprise, at block 410 (optional), sending, with the client device, a query to one or more media content servers to request entitlement information associated with the requested DRM-protected media content. At optional block 415, receiving, with the client device, the requested entitlement information associated with the requested DRM-protected media content.

In response to receiving the requested entitlement information associated with the requested DRM-protected media content, method 400 might further comprise sending, with the client device, a query to an entitlement gateway to determine whether the user is authorized to access the requested DRM-protected media content (block 420). In some embodiments, the entitlement gateway is embodied within a device including, without limitation, at least one of a dedicated entitlement gateway device, a set-top box ("STB"), a digital video recording ("DVR") device, a main display device running a software application ("app"), a user device running an app, a server computer over a network, a cloud-based computing system over a network, a media player, or a gaming console, and/or the like. At block 425, method 400 might comprise determining, with the entitlement gateway, whether the user is authorized to access the DRM-protected media content that is requested by the user. If so, method 400 might proceed to the process at block 435. If not, method 400 might proceed to the process at block 430. In some embodiments, determining whether the user is authorized to access the requested DRM-protected media content might comprise determining, with the entitlement gateway, whether the user is authorized to access the requested DRM-protected media content by authenticating client device-identifying information. In some instances, the client device-identifying information might be stored in an entitlements data store (which might be local to the entitlement gateway or remotely accessible via a network, or the like).

At block 430, based on a determination that the user is not authorized to access the requested DRM-protected media content (as determined at block 425), sending, with the entitlement gateway, a deny signal to the client device that prevents the user from accessing the requested DRM-protected media content.

At block 435, based on a determination that the user is authorized to access the requested DRM-protected media content (as determined at block 425), identifying, with the entitlement gateway and from among a plurality of DRM types, a DRM type that is used to protect the requested DRM-protected media content. Method 400, at block 440, might comprise identifying, with the entitlement gateway and from among a plurality of DRM servers, a DRM server associated with the identified DRM type. Method 400 might further comprise, based on the identified DRM type, sending, with the entitlement gateway, a request for a license for accessing the requested DRM-protected media content from the identified DRM server associated with the identified DRM type that is used to protect the requested DRM-protected media content (block 445). According to some embodiments, the plurality of DRM types might be based on DRM technology systems each including, without limitation, one of PlayReady, FairPlay, Widevine, FreeWheel, Adobe Access, or Advanced Access Control System ("AACS"), and/or the like. Method 400 might comprise, at block 450, receiving, with the entitlement gateway, the license for accessing the requested DRM-protected media content from the DRM server associated with the identified DRM type. Method 400 might further comprise sending, with the entitlement gateway, the license to the client device, the license enabling the user to access the requested DRM-protected media content (block 455).

With reference to FIG. 4B, identifying, with the entitlement gateway and from among a plurality of DRM types, a DRM type that is used to protect the requested DRM-protected media content (at block 435) might comprise one of: sending, with the entitlement gateway, one or more queries in parallel to all relevant DRM servers among the plurality of DRM servers (block 460); sending, with the entitlement gateway, one or more queries sequentially to all relevant DRM servers among the plurality of DRM servers (block 465); or sending, with the entitlement gateway, one or more queries to one or more caches to determine the most frequently used DRM scheme (block 470), and querying, with the entitlement gateway, the relevant DRM servers among the plurality of DRM servers in order of frequency of use (block 475).

Exemplary System and Hardware Implementation

Figure 5:
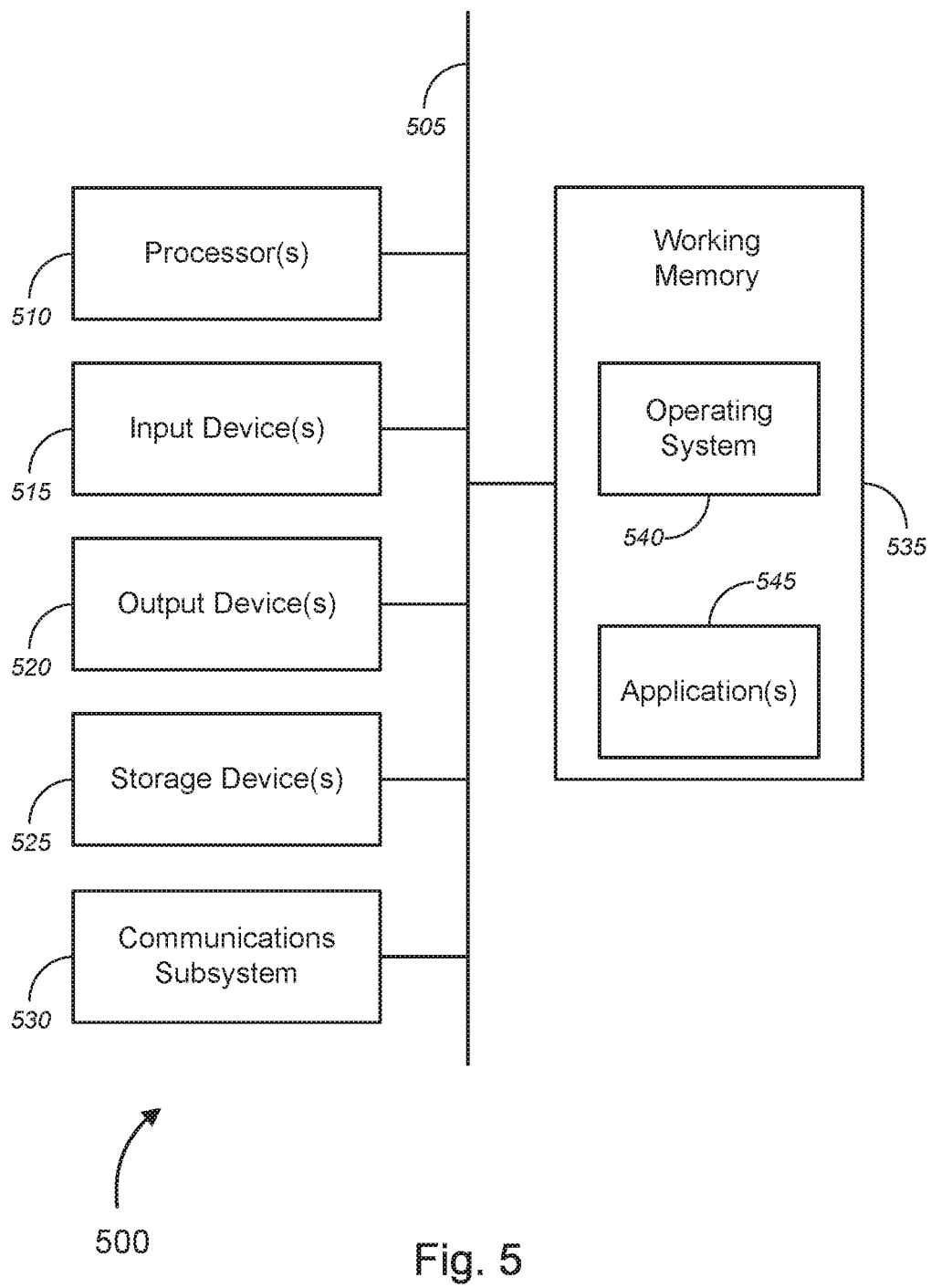
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., entitlement gateways 105*a*, 105*b*, 205*a*, 205*b*, and 320, client devices 115*a*-115*n* and 305, main display devices 215, user devices 220, audio playback devices 225*a*-225*n*, media content servers/asset servers/content delivery network ("CDN") 135*a*-135*n*, 235*a*-235*n*, and 310, digital rights management ("DRM") servers 155*a*-155*n*, 255*a*-255*n*, and 330, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., entitlement gateways 105a, 105b, 205a, 205b, and 320, client devices 115a-115n and 305, main display devices 215, user devices 220, audio playback devices 225a-225n, media content servers/asset servers/CDN 135a-135n, 235a-235n, and 310, DRM servers 155a-155n, 255a-255n, and 330, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
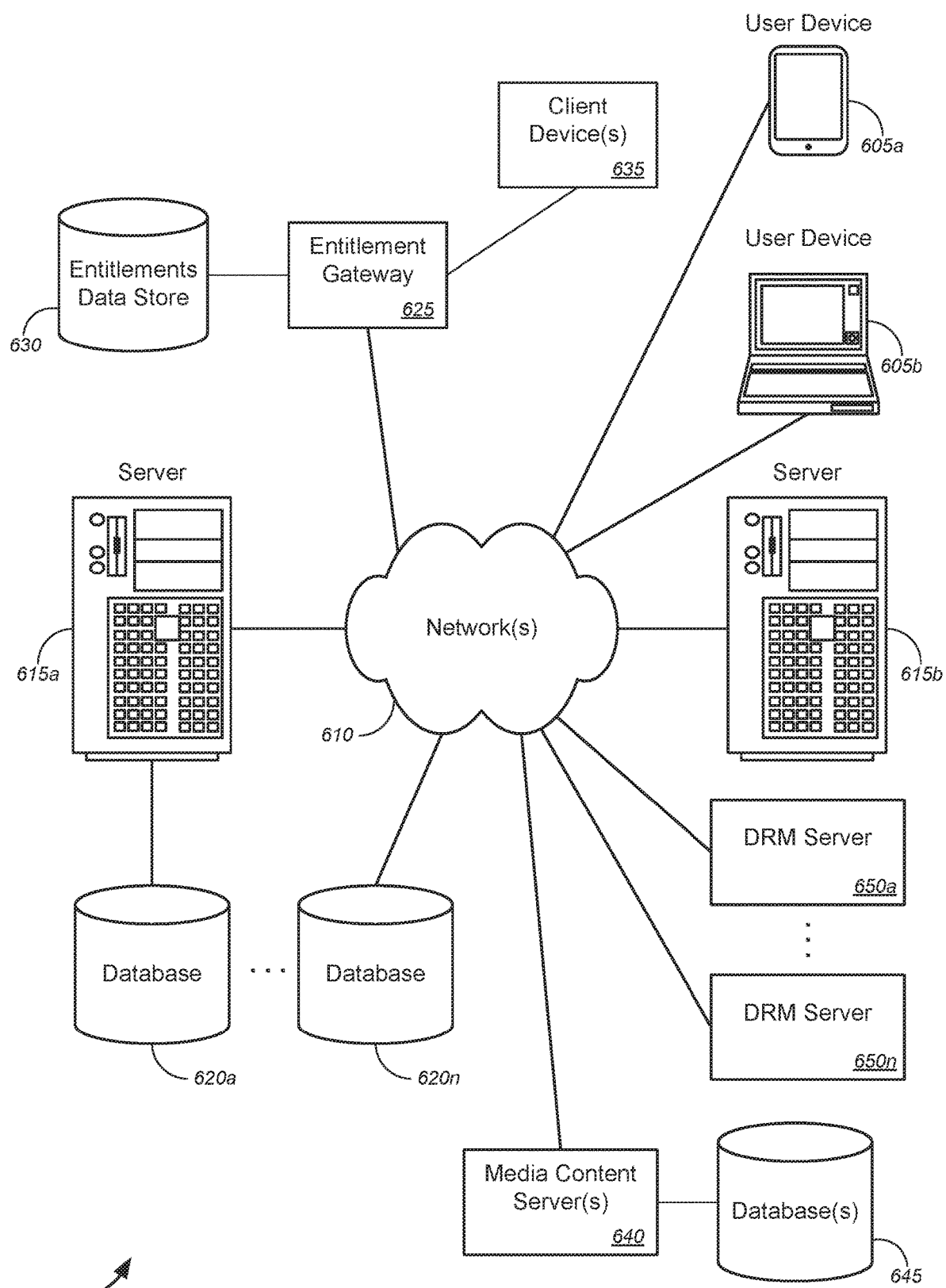
FIG. 6 is a block diagram illustrating a networked system of computers, computing systems, or system hardware architecture, which can be used in accordance with various embodiments.

As noted above, a set of embodiments comprises methods and systems for implementing media content streaming or playback, and, more particularly, to methods, systems, and apparatuses for implementing digital rights management ("DRM")-agnostic entitlement gateway and verification system. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 145 and 245 of FIGS. 1 and 2, or the like) can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing media content streaming or playback, and, more particularly, to methods, systems, and apparatuses for implementing digital rights management ("DRM")-agnostic entitlement gateway and verification system, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise entitlement gateway 625, entitlements data store 630, one or more client devices 635, one or more media content sources 640 and corresponding databases 645, and one or more digital rights management ("DRM") servers 650a-650n (collectively, "DRM servers 650" or the like).

In operation, a client device 635 (or user device(s) 605) might receive a request from a user to access media content that is protected by DRM technology. The client device 635 (or user device(s) 605) might send a query to one or more media content servers 640 to request entitlement information associated with the requested DRM-protected media content, in response to receiving the request from the user. In response to receiving the requested entitlement information associated with the requested DRM-protected media content, the client device 635 (or user device(s) 605) might send a query to entitlement gateway 625 to determine whether the user is authorized to access the requested DRM-protected media content. Based on a determination that the user is not authorized to access the requested DRM-protected media content, the entitlement gateway 625 might send a deny signal to the client device 635 (or user device(s) 605) that prevents the user from accessing the requested DRM-protected media content. Based on a determination that the user is authorized to access the requested DRM-protected media content, the entitlement gateway 625 might identify, from among a plurality of DRM types, a DRM type that is used to protect the requested DRM-protected media content. Based on the identified DRM type, the entitlement gateway 625 might identify, from among a plurality of DRM servers 650 each associated with a particular DRM type, a DRM server 650 associated with the identified DRM type that is used to protect the requested DRM-protected media content, and might send a request for a license for accessing the requested DRM-protected media content from the identified DRM server 650 associated with the identified DRM type that is used to protect the requested DRM-protected media content. In response to receiving the license for accessing the requested DRM-protected media content from the DRM server 650 associated with the identified DRM type, the entitlement gateway 625 might send the license to the client device 635, the license enabling the user to access the requested DRM-protected media content.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   receiving, with an entitlement gateway, a query from a client device for a user to access media content that is protected by digital rights management ("DRM") technology;
   determining, with the entitlement gateway, whether the user is authorized to access the ORM-protected media content that is requested by the user;
   based on a determination that the user is not authorized to access the requested DRM-protected media content, sending, with the entitlement gateway, a deny signal to the client device that prevents the user from accessing the requested DRM-protected media content;
   based on a determination that the user is authorized to access the requested DRM protected media content, identifying, with the entitlement gateway and from among a plurality of DRM types, a DRM type that is used to protect the requested DRM-protected media content, the entitlement gateway being agnostic to DRM types, wherein identifying, from among a plurality of DRM types, a DRM type that is used to protect the requested DRM-protected media content comprises one of:
   sending, with the entitlement gateway, one or more queries in parallel to all relevant DRM servers among the plurality of DRM servers;
   sending, with the entitlement gateway, one or more queries sequentially to all relevant DRM servers among the plurality of DRM servers; or
   sending, with the entitlement gateway, one or more queries to one or more caches to determine the most frequently used DRM scheme, and querying, with the entitlement gateway, the relevant DRM servers among the plurality of DRM servers in order of frequency of use";
   based on the identified DRM type, determining, with the entitlement gateway and from among a plurality of DRM servers each associated with a particular DRM type, a DRM server associated with the identified DRM type that is used to protect the requested DRM-protected media content, and sending, with the entitlement gateway, a request for a license for accessing the requested DRM-protected media content from the identified DRM server; and
   in response to receiving the license for accessing the requested ORM-protected media content from the identified DRM server associated with the identified DRM type, sending, with the entitlement gateway, the license to the client device, the license enabling the user to access the requested ORM-protected media content".

2. The method of claim 1, wherein the entitlement gateway is embodied within a device comprising at least one of a dedicated entitlement gateway device, a set-top box ("STB"), a digital video recording ("DVR") device, a main display device running a software application ("app"), a user device running an app, a server computer over a network, a cloud-based computing system over a network, a media player, or a gaming console.

3. The method of claim 1, wherein the client device comprises one of a laptop computer, a tablet computer, a smart phone, a mobile phone, a personal digital assistant, a remote control device, or a portable gaming device.

4. The method of claim 1, wherein the requested DRM-protected media content comprises at least one of video content, video-on-demand ("VoD") content, streaming video content, pay-per-view ("PPV") video content, audio content, audio-on-demand ("AD") content, streaming audio content, pay-per-listen ("PPL") audio content, image content, game content, game-on-demand content, streaming game content, or pay-per-play ("PPP") game content.

5. The method of claim 1, wherein the plurality of DRM types are based on DRM technology systems each comprising one of PlayReady, FairPlay, Widevine, FreeWheel, Adobe Access, or Advanced Access Control System ("AACS").

6. The method of claim 1, wherein determining whether the user is authorized to access the requested DRM-protected media content comprises determining, with the entitlement gateway, whether the user is authorized to access the requested DRM-protected media content by authenticating client device-identifying information.

7. The method of claim 6, wherein the client device-Identifying information is stored in an entitlements data store.

8. An entitlement gateway, comprising:
   at least one processor; and
   a non-transitory computer readable medium communicatively coupled to the at least one processor, the non-transitory computer readable medium having stored thereon computer software comprising a set of instructions that, when executed by the at least one processor, causes the entitlement gateway to:
   receive a query from a client device for a user to access media content that is protected by digital rights management ("DRM") technology;
   determine whether the user is authorized to access the DRM-protected media content that is requested by the user;
   based on a determination that the user is not authorized to access the requested DRM-protected media content, send a deny signal to the client device that prevents the user from accessing the requested DRM-protected media content;
   based on a determination that the user is authorized to access the requested DRM-protected media content, identify, from among a plurality of DRM types, a DRM type that is used to protect the requested DRM-protected media content, the entitlement gateway being agnostic to DRM tye wherein identifying, from among a plurality of DRM types, a DRM type that is used to protect the requested DRM-protected media content comprises one of:
   sending one or more queries in parallel to all relevant DRM servers among the plurality of DRM servers;
   sending one or more queries sequentially to all relevant DRM servers among the plurality of DRM servers; or
   sending one or more queries to one or more caches to determine the most frequently used DRM scheme, and querying, with the entitlement gateway, the relevant DRM servers among the plurality of DRM servers in order of frequency of use;
   based on the identified DRM type, identify, from among a plurality of DRM servers each associated with a particular DRM type, a DRM server associated with the identified DRM type that is used to protect the requested DRM-protected media content, and send a request for a license for accessing the requested DRM-protected media content from the identified DRM server; and in response to receiving the license for accessing the requested DRM-protected media content from the identified DRM server associated with the identified DRM type, send the license to the client device, the license enabling the user to access the requested DRM-protected media content.

9. The entitlement gateway of claim 8, wherein the entitlement gateway is embodied within a device comprising at least one of a dedicated entitlement gateway device, a set-top box ("STB"), a digital video recording ("DVR") device, a main display device running a software application ("app"), a user device running an app, a server computer over a network, a cloud-based computing system over a network, a media player, or a gaming console.

10. The entitlement gateway of claim 8, wherein the client device comprises one of a laptop computer, a tablet computer, a smart phone, a mobile phone, a personal digital assistant, a remote control device, or a portable gaming device.

11. The entitlement gateway of claim 8, wherein the requested DRM-protected media content comprises at least one of video content, video-on-demand ("VoD") content, streaming video content, pay-per-view ("PPV") video content, audio content, audio-on-demand ("AoD") content, streaming audio content, pay-per-listen ("PPL") audio content, image content, game content, game-on-demand content, streaming game content, or pay-per-play ("PPP") game content.

12. The entitlement gateway of claim 8, wherein the plurality of DRM types are based on DRM technology systems each comprising one of PlayReady, FairPlay, Widevine, FreeWheel, Adobe Access, or Advanced Access Control System ("AACS").

13. The entitlement gateway of claim 8, wherein determining whether the user is authorized to access the requested DRM-protected media content comprises determining whether the user is authorized to access the requested DRM-protected media content by authenticating client device-identifying information.

14. The entitlement gateway of claim 13, wherein the client device-identifying information is stored in an entitlements data store.

15. A system, comprising:
a client device, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the client device to:
receive a request from a user to access media content that is protected by digital rights management ("DRM") technology;
in response to receiving the request from the user, send a query to one or more media content servers to request entitlement information associated with the requested DRM-protected media content; and
in response to receiving the requested entitlement information associated with the requested DRM-protected media content, sending, with the client device, a query to an entitlement gateway determine whether the user is authorized to access the requested DRM-protected media content;
the entitlement gateway, comprising:
at least one second processor; and
a second non-transitory computer readable medium communicatively coupled the at least one second processor, the second non-transitory computer readable medium having stored thereon computer software comprising a second set of instructions that, when executed by the at least one second processor, causes the entitlement gateway to:
receive the query from the client device;
determine whether the user is authorized to access the DRM-protected media content that is requested by the user;
based on determination that the user is not authorized to access the requested DRM-protected media content, send a deny signal to the client device that prevents the user from accessing the requested DRM-protected media content;
based on determination that the user is authorized to access the requested DRM-protected media content, identify, from among a plurality of DRM types, a DRM type that is used to protect the requested DRM-protected media content, the entitlement gateway being agnostic to DRM types, wherein identifying, from among a plurality of DRM types, a DRM type that is used to protect the requested DRM-protected media content comprises one of:
sending one or more queries in parallel to all relevant DRM servers among the plurality of DRM servers;
sending e or more queries sequentially to all relevant DRM servers among the plurality of DRM servers; or
sending one or more queries to one or more caches to determine the most frequently used DRM scheme, and querying with the entitlement gateway, the relevant DRM servers among the plurality of DRM servers in order of frequency of use;
based on the identified DRM type, identify, from among a plurality of DRM servers each associated with a particular DRM type, a DRM server associated with the identified DRM type that is used to protect the requested DRM-protected media content, and send request for a license for accessing the requested DRM-protected media content from the identified DRM server; and
in response to receiving the license for accessing the requested DRM-protected media content from the identified DRM server associated with the identified DRM type, send the license to the client device, the license enabling the user to access the requested DRM-protected media content.

16. The system of claim 15, wherein the entitlement gateway is embodied within a device comprising at least one of a dedicated entitlement gateway device, a set-top box ("STB"), a digital video recording ("DVR") device, a main display device running a software application ("app"), a user device running an app, a server computer over a network, a cloud-based computing system over a network, a media player, or a gaming console.

17. The system of claim 15, wherein the client device comprises one of a laptop computer, a tablet computer, a smart phone, a mobile phone, a personal digital assistant, a remote control device, or a portable gaming device.

* * * * *